(12) United States Patent
Bartov

(10) Patent No.: US 9,102,415 B2
(45) Date of Patent: Aug. 11, 2015

(54) MULTI-ORIFICE BYPASS FOR A HYDRAULIC MOTOR ASSEMBLY

(75) Inventor: Asher Bartov, Los Angeles, CA (US)

(73) Assignee: Federal Industries, Inc., El Segundo, CA (US)

( * ) Notice: Subject to any disclaimer, the term of this patent is extended or adjusted under 35 U.S.C. 154(b) by 550 days.

(21) Appl. No.: 13/597,006

(22) Filed: Aug. 28, 2012

(65) Prior Publication Data

US 2014/0060017 A1  Mar. 6, 2014

(51) Int. Cl.
*F16D 31/02* (2006.01)
*B64D 39/02* (2006.01)
*F16H 61/4052* (2010.01)
*F15B 11/08* (2006.01)

(52) U.S. Cl.
CPC ............... *B64D 39/02* (2013.01); *F15B 11/08* (2013.01); *F16H 61/4052* (2013.01); *F15B 2211/40507* (2013.01); *F15B 2211/40515* (2013.01); *F15B 2211/415* (2013.01); *F15B 2211/426* (2013.01); *F15B 2211/7058* (2013.01); *F15B 2211/763* (2013.01)

(58) Field of Classification Search
CPC . B64D 39/02; F16H 61/4035; F16H 61/4043; F16H 61/4052
USPC .......................................................... 60/468
See application file for complete search history.

(56) References Cited

U.S. PATENT DOCUMENTS

| | | | | |
|---|---|---|---|---|
| 4,694,649 A * | 9/1987 | Howeth | .......................... | 60/468 |
| 4,920,748 A * | 5/1990 | Kordak et al. | ................. | 60/414 |
| 6,454,212 B1 | 9/2002 | Bartov | | |
| 6,786,455 B1 * | 9/2004 | Bartov | ..................... | 244/135 A |
| 6,866,228 B2 | 3/2005 | Bartov | | |
| 7,926,267 B2 * | 4/2011 | Koehler et al. | ................. | 60/468 |

* cited by examiner

*Primary Examiner* — Michael Leslie
(74) *Attorney, Agent, or Firm* — Blakely Sokoloff Taylor & Zafman LLP

(57) ABSTRACT

Apparatuses and systems that use a variable displacement motor-pump (VDMP) to control the position of a hose of an aerial refueling system are disclosed. At VDMP displacements greater than required to hold a position of the hose, the VDMP operates in a motor mode to retract the hose. For lesser VDMP displacements, the VDMP operates in a pump mode to control extension of the hose. In accordance with some embodiments, a dual orifice conveys hydraulic fluid at varying rates depending upon the VDMP operational mode.

19 Claims, 7 Drawing Sheets

MULTI-ORIFICE BYPASS FOR A HYDRAULIC MOTOR ASSEMBLY

BACKGROUND

Aerial refueling of a receiver aircraft from a tanker aircraft is commonly performed. Nevertheless, aerial refueling is a difficult and dangerous maneuver that is typically attempted only by military personnel throughout the world. Today, usually two types of aerial refueling systems are used: extendable boom systems and hose-and-drogue systems.

In a hose-and-drogue system, the drogue is attached to the outlet end of a hose. The inlet end of the hose is attached to a hose reel onto which the hose is wound. The hose reel is typically mounted either within a tanker aircraft fuselage or on a refueling pod or module which is attached to the bottom of the tanker aircraft. The hose reel is commonly connected to a motor and/or pump that is hydraulically driven. The hydraulic motor-pump can be connected through a coupling system, which may include, e.g., various gear boxes, shafts, and couplings. When the hose is deployed from the tanker aircraft, the drogue encounters drag and the hose reel rotates in a trail direction in which the hose extends behind the tanker aircraft.

When the hose and the drogue are fully extended, a pilot of a receiver aircraft maneuvers the receiver aircraft to engage a refueling probe of the receiver aircraft with the drogue. Danger arises because the high speeds of the tanker and receiver aircrafts relative to the ground and to each other can result in the drogue being hit with considerable force during engagement. Such engagements may create slack in the hose that must be quickly eliminated. Otherwise, the risk of aircraft accidents increases substantially. Retracting the hose onto the hose reel eliminates the slack.

After the drogue is engaged, fuel can be pumped from the tanker aircraft to the receiver aircraft. When refueling is complete, the pilot of the receiver aircraft disengages the refueling probe from the drogue. When the receiver aircraft tries to disengage within the refueling range, it is referred to as "flowing disconnect", and pulling forces on the hose can increase significantly. The hose can then be retracted onto the hose reel for storage by rotating the hose reel in a retract direction.

Thus, the hydraulic motor-pump operates in a pump mode to rotate the hose reel in a trail direction and to extend the hose. Conversely, the hydraulic motor-pump operates in a motor mode to rotate the hose reel in the retract direction and to retract the hose onto the hose reel. In the trail mode, hose position can be controlled independently from variations in hose tension. In the retract mode, hose tension can be controlled independently from variations in hose position.

Aerial refueling systems have utilized hydraulic motor-pumps incorporating fixed displacement hydraulic motors that control the extension of the hose in a pump mode and control the retraction of the hose in a motor mode. However, such systems suffer from low hose retraction rates and accessory components that increase overall weight and response time of the system. Information relevant to attempts to address these problems can be found in U.S. Pat. Nos. 6,454,212 and 6,866,228, which disclose variable displacement hydraulic motor-controlled hose reel drive systems.

SUMMARY OF THE DESCRIPTION

Embodiments generally provide apparatuses and systems that regulate the output of a variable displacement motor-pump (VDMP) by varying the VDMP displacement, with relatively constant system pressure. Embodiments also generally provide apparatuses and systems that convey hydraulic fluid in parallel with the VDMP at varying rates depending upon the VDMP operational mode. Embodiments are described in relation to their use in an aerial refueling system, but it will be appreciated that the embodiments may also be used in other hydraulic systems and applications. For example, the embodiments can relate to applications such as ship-to-ship refueling and offshore oil operations.

In an embodiment, a hydraulic motor assembly (HMA) includes a VDMP coupled with a supply conduit and a return conduit. The VDMP has a spline shaft coupled with a hose reel of an aerial refueling system and when the VDMP operates in a pump mode at a flow rate, the VDMP rotates the hose reel in a trail direction. The HMA also includes a dual orifice (DO) coupled with the supply conduit and the return conduit in parallel with the VDMP, which can function as a bypass valve. The DO includes a fixed orifice, which continuously conveys hydraulic fluid from the supply conduit to the return conduit, and a variable orifice, which only conveys hydraulic fluid from the supply conduit to the return conduit when the VDMP operates in the pump mode and the flow rate reaches a predetermined rate. The HMA can also include a check valve located between the VDMP and an aircraft hydraulic system to prevent hydraulic fluid from being conveyed into the aircraft hydraulic system.

In an embodiment, the fixed orifice of the DO continuously conveys hydraulic fluid at a rate in a range of about 1 to 5 gallons per minute (GPM) when the hydraulic fluid in the supply conduit is at about 3000 psig pressure. In an embodiment, the variable orifice conveys hydraulic fluid at a rate in a range of about 5 to 15 GPM when it is open and the hydraulic fluid in the supply conduit is at about 3000 psig pressure. In one embodiment, the variable orifice comprises a solenoid valve.

In another embodiment, a method includes operating a VDMP in a first pump mode at a first flow rate to rotate a hose reel of an aircraft refueling system in a trail direction. Hydraulic fluid is conveyed from a supply conduit to a return conduit through a fixed orifice of a DO while the VDMP is in the first pump mode. In the method, the VDMP is transitioned to operate in a second pump mode at a second flow rate. In response to the second pump mode, hydraulic fluid is conveyed from the supply conduit to the return conduit through both the fixed orifice and a variable orifice of the DO. In an embodiment, the second flow rate is more than 1 GPM. For example, the second flow rate can be in a range of about 1 to 5 GPM. In an embodiment, the variable orifice includes a solenoid valve.

The above summary does not include an exhaustive list of all aspects of the present invention. It is contemplated that the invention includes all systems and methods that can be practiced from all suitable combinations of the various aspects summarized above, and also those disclosed in the detailed description below.

BRIEF DESCRIPTION OF THE DRAWINGS

The present invention is illustrated by way of example and not limitation in the figures of the accompanying drawings in which like references indicate similar, but not necessarily identical, elements.

DETAILED DESCRIPTION

Various embodiments and aspects will be described with reference to details discussed below, and the accompanying drawings will illustrate the various embodiments. The following description and drawings are illustrative and are not to be construed as limiting the invention. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with an embodiment can be included in at least one embodiment. In addition, the appearances of the phrase "in one embodiment" in various places in the specification do not necessarily all refer to the same embodiment.

Figure 1:
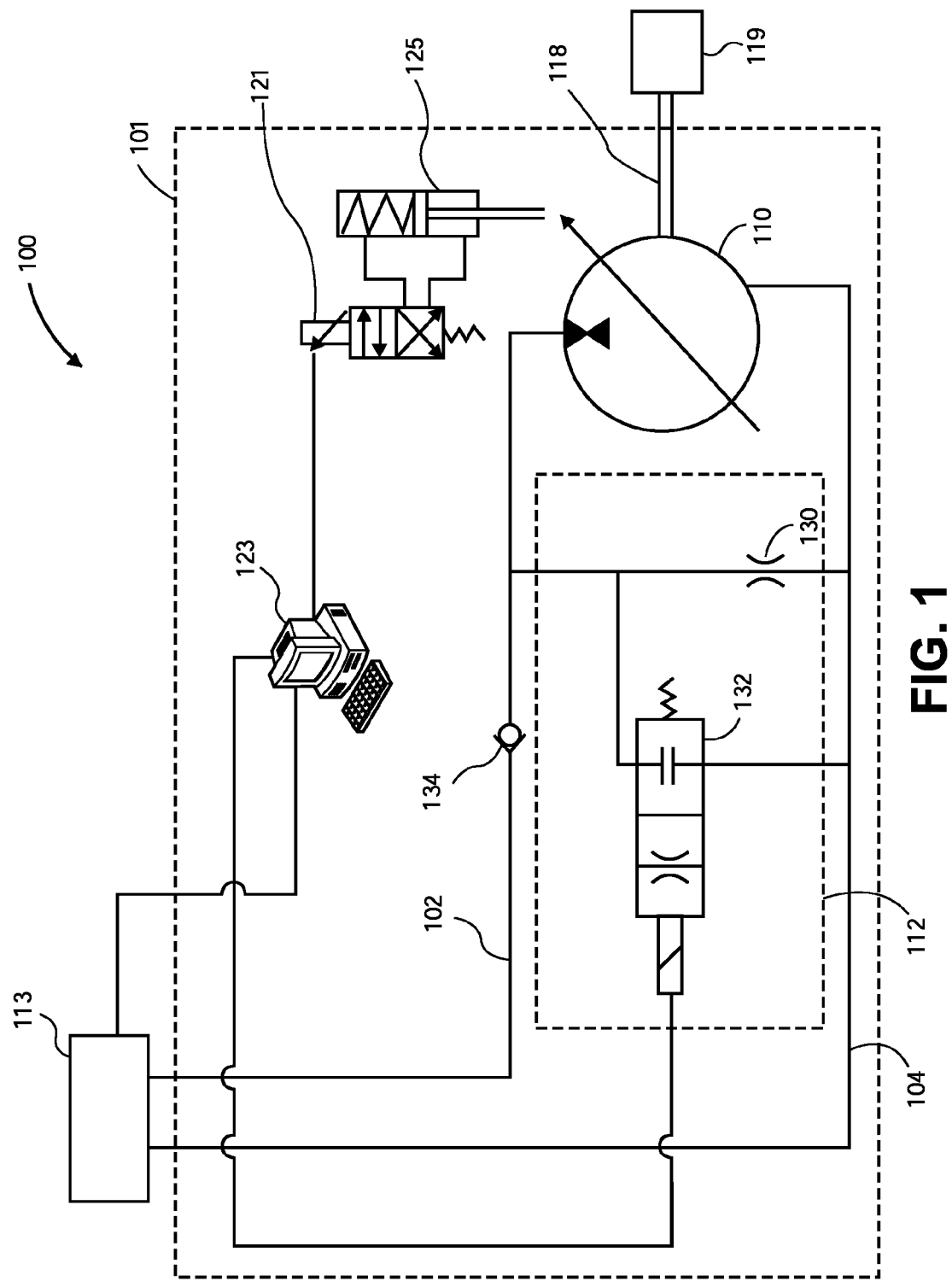
FIG. 1 is a schematic view illustration of an aerial refueling system in accordance with an embodiment.

Referring to FIG. 1, a schematic view illustration of an aerial refueling system is shown in accordance with an embodiment. The aerial refueling system includes hydraulic motor assembly (HMA) 101 that has a conduit system to interconnect various components of HMA 101. The conduit system includes various conduits, such as supply conduit 102 and return conduit 104. Furthermore, HMA 101 includes variable displacement motor-pump (VDMP) 110 that connects with supply conduit 102 and return conduit 104. HMA 101 also includes dual orifice (DO) 112 that connects with supply conduit 102 and return conduit 104, in parallel with VDMP 110.

Supply conduit 102 can extend from HMA 101 to aircraft hydraulic system 113 through a series of hydraulic pumps, valves, fittings, conduits, etc. This series of fluid pathways can connect with a reservoir (not shown) of aircraft hydraulic system 113 and can be duplicated in whole or in part to create redundant aircraft hydraulic systems that ensure supply of hydraulic fluid to HMA 101 in the event of a failed subsystem, e.g., a failed pump or valve. Return conduit 104 can return hydraulic fluid from HMA 101 to aircraft hydraulic system 113. Hydraulic fluid can be conveyed from return conduit 104 to the reservoir of aircraft hydraulic system 113 through a series of hydraulic pumps, valves, fittings, conduits, etc. similar or different from the series described above with respect to supply conduit 102.

Still referring to FIG. 1, hydraulic fluid is conveyed between supply conduit 102 and return conduit 104. The conveyance of hydraulic fluid between supply conduit 102 and return conduit 104 need not be between the same two points. Depending on the mode in which HMA 101 is operating, the direction and or path that hydraulic fluid flows may vary. For example, when HMA 101 is operating with VDMP 110 in a motor mode, hydraulic fluid is conveyed directly from supply conduit 102 to return conduit 104 through both VDMP 110 and DO 112. In contrast, when HMA 101 is operating with VDMP 110 in pump mode, flow in VDMP 110 is reversed such that hydraulic fluid is conveyed from return conduit 104 to supply conduit 102 through VDMP 110 while hydraulic fluid is conveyed from supply conduit 102 to return conduit 104 through DO 112. Thus, in at least one embodiment, hydraulic fluid recirculates through VDMP 110 via DO 112 when VDMP 110 operates in a pump mode. Additional details regarding flow patterns in HMA 101 are provided below.

It will be appreciated that a conduit as used herein refers generally to a fluid pathway, such as a fluid pathway that exists between two components of HMA 101. Therefore, any conduit may be composed of one or more tubes, hoses, fittings, etc., that can create a continuous fluid pathway between the components that the conduit is described as being connected with. In various embodiments, conduit system can include rigid fluid lines, flexible hose, drilled passages in manifolds, or any communicating volumes in which the fluid is in a functionally equivalent state. More particularly, the various conduits may be rigid tubing fabricated from copper, aluminum alloy, steel, or titanium 3Al-2.5V alloy, as is commonly used in aircraft hydraulic systems. However, conduit selection may be based on considerations such as operating pressures, space limitations, and routing requirements through the aircraft body. Thus, one skilled in the art will appreciate that the conduits may be formed from various other known materials and forms that meet the design requirements of a particular case.

HMA 101 includes VDMP 110 that has a first port connected with supply conduit 102 and a second port connected with return conduit 104. As described above, when VDMP 110 operates in a motor mode, hydraulic fluid is conveyed from supply conduit 102 to return conduit 104 through VDMP 110 ports. In contrast, when VDMP 110 operates in a pump mode, hydraulic fluid can be sucked from return conduit 104 to supply conduit 102 through VDMP 110 ports.

VDMP 110 also includes spline shaft 118 that is driven by, or drives, the internal mechanisms of VDMP 110. Without going into detail, as the internal mechanisms and functions of VDMP 110 will be known to one skilled in the art, VDMP 110 can comprise inner structures, e.g., pistons, piston mounting plates, etc., that facilitate the conversion of fluid energy into mechanical energy, and vice versa. More particularly, in the pump mode VDMP 110 converts mechanical energy in spline shaft 118 into fluid energy in the hydraulic fluid of HMA 101. Conversely, in the motor mode, VDMP 110 converts fluid energy in the hydraulic fluid of HMA 101 into mechanical energy in spline shaft 118.

Spline shaft 118 connects with hose reel 119 of the aerial refueling system 100 through various gear boxes, shafts, and couplings, as is known in the art. Additionally, hose reel 119 can connect with a hose and drogue of the aerial refueling system 100. Thus, spline shaft 118 will rotate in opposite directions corresponding to the extension and retraction of the hose. More particularly, in the pump mode, spline shaft 118 will rotate in a direction corresponding to rotation of hose reel 119 in a trail direction and extension of the hose. Conversely, in the motor mode, spline shaft 118 will rotate in a direction corresponding to rotation of hose reel 119 in a retract direction and retraction of the hose.

Thus, whether VDMP 110 operates in a pump or motor mode can be characterized by observing the net torque applied to spline shaft 118 by fluid energy in HMA 101 and by hose reel 119. More particularly, the net torque applied to spline shaft 118 can be considered positive when operating in a motor mode and negative when operating in a pump mode. One skilled in the art will appreciate that the torque at which VDMP 110 drives spline shaft 118, i.e., the torque applied to spline shaft 118 by the fluid energy in HMA 101, can be controlled by electro-hydraulic control valve 121. By way of summary description, electro-hydraulic control valve 121 increases or decreases the pressure of hydraulic fluid within spring-biased displacement control piston 125. The hydraulic pressure in control piston 125 causes that piston to move into a position corresponding to such pressure. The position of control piston 125 determines the displacement of VDMP 110, which in turn determines the torque applied to spline shaft 118 by fluid energy in HMA 101 for a given hydraulic pressure supplied to VDMP 110.

By way of example, when electro-hydraulic control valve 121 manages control piston 125 so that VDMP 110 displacement is zero, there is minimal torque transmitted to spline shaft 118 by fluid energy in HMA 101. Therefore, if the hose is deployed from the tanker aircraft fuselage, there would be negligible resistance torque to counteract the torque applied to spline shaft 118 by aerodynamic drag on the hose through hose reel 119. Thus, spline shaft 118 would rotate freely and the hose would extend at a maximum rate. In this mode of operation, VDMP 110 can be described as operating in the "pump mode". Conversely, when electro-hydraulic valve 121 manages control piston 125 so that VDMP 110 displacement is maximized, there is maximum torque transmitted to spline shaft 118 by fluid energy in HMA 101. Thus, under most conditions, spline shaft 118 is able to overcome torque applied by aerodynamic drag and hose reel 119 is rotated in a retract direction to retract the hose onto hose reel 119. In this mode of operation, VDMP 110 can be described as operating in the "motor mode".

It will be appreciated that electro-hydraulic control valve 121 can be controlled by a microprocessor (e.g., as represented by computer 123) based, for example, on flight data and commands provided by, e.g., the tanker aircraft pilot, avionics equipment, or various sensors of HMA 101. Thus, HMA 101 is not a passive system, but is rather an actively controlled system, even when the net torque on the spline shaft is negative, i.e., when VDMP 110 is operating in the pump mode. More specifically, HMA 101 is a feedback positioning system whose primary function is to maintain tension on the refueling hose and thus can control torque applied to spline shaft 118 even when the hose is extending. Additionally, VDMP 110 is a constant pressure system in which torque is controlled by varying displacement to balance spline shaft 118 torque with load torque. As stated above, the displacement is controlled by electro-hydraulic control valve 121, which operates control piston 125 in a feedback control loop. When HMA 101 controls the displacement (output torque) of VDMP 110 at a point that is greater than required to maintain the load, VDMP 110 acts as a motor to rotate hose reel 119 in a retract direction and to retract the hose. It will be appreciated that not all sensors and feedback loops required for operation of VDMP 110 are shown in the accompanying figures, and these sensors and feedback loops can also be controlled by a microprocessor represented by computer 123.

In an embodiment, HMA 101 includes DO 112 connected with supply conduit 102 and return conduit 104 in parallel with VDMP 110. The term "connected in parallel" does not imply that flow through VDMP 110 and DO 112 must be in the same direction. Indeed, flow through VDMP 110 and DO 112 can be in opposite directions, e.g., in the case where VDMP 110 operates in a pump mode, as described above. DO 112 includes fixed orifice 130 and variable orifice 132, which allow for flow through the DO 112 between the supply conduit 102 and the return conduit 104.

Fixed orifice 130 is sized and configured to allow the flow of hydraulic fluid from the supply conduit 102 to return conduit 104 at a given rate. More specifically, fixed orifice 130 can be a flow restriction, such as a precision machined hole formed in a cylinder with a diameter chosen to restrict flow to a predetermined rate when VDMP 110 operates in a motor mode. As an example, the predetermined rate can be about 1 to 5 GPM when the pressure of hydraulic fluid in supply conduit 102 is about 3000 psig as VDMP 110 operates in a motor mode. One skilled in the art will appreciate that various fixed orifice diameters and cross-sections can be used to achieve these flow characteristics. More specifically, the choice of orifice configurations can depend on the system characteristics, such as the properties of the hydraulic fluid used and the pressure of hydraulic fluid supplied by the aircraft hydraulic system in normal operation. In an embodiment, flow through fixed orifice 130 is continuous, allowing for a constant bleed of hydraulic fluid from supply conduit 102 to return conduit 104. However, it is contemplated that fixed orifice 130 can be sized to limit bleed flow in order to minimize wasted flow of hydraulic fluid and associated energy.

Variable orifice 132 is also sized and configured to allow hydraulic fluid to flow from supply conduit 102 to return conduit 104. Variable orifice 132 can provide a flow restriction that varies depending on one or more operating conditions of HMA 101. For example, variable orifice 132 can be configured to disallow flow when VDMP 110 is operating in a motor mode or when VDMP 110 is operating in a pump mode at a low flow rate. More specifically, variable orifice 132 can be configured to remain closed unless VDMP 110 is operating, or is expected to operate, in a pump mode with a pump flow of at least 1 GPM. Even more particularly, the variable orifice 132 can be configured to remain closed unless VDMP 110 is operating, or is expected to operate, in a pump mode with a pump flow in a range of 1 to 5 GPM. Computer 123 can actuate variable orifice 132 based on signals provided by sensors throughout HMA 101. For example, components of HMA 101 can be coupled with various sensors to provide an output signal to computer 123 proportional to displacement of VDMP 110, rotational speed and direction of spline shaft 118, or other system conditions. Based on these signals, computer 123 can calculate an expected flow of VDMP 110, and can open or close variable orifice 132 to increase or decrease hydraulic fluid flow through DO 112 in response to the expected flow. Thus, in an embodiment, variable orifice 132 can be opened prior to changing a displacement of VDMP 110.

In an embodiment, HMA 101 can include valve 134 to prevent backflow of hydraulic fluid from VDMP 110 and DO 112 into aircraft hydraulic system 113. For example, valve 134 can be a check valve that limits flow in a single direction. Thus, valve 134 can be oriented to allow hydraulic fluid to flow from aircraft hydraulic system 113 to VDMP 110 and DO 112 when the pressure of hydraulic fluid at an inlet of valve 134 exceeds the pressure of hydraulic fluid at an outlet of valve 134. Conversely, valve 134 can disallow backflow of hydraulic fluid from VDMP 110 and DO 112 into aircraft hydraulic system 113 if the pressure of hydraulic fluid at the outlet exceeds the pressure of hydraulic fluid at the inlet. It will be appreciated that valve 134 need not be a check valve. For example, valve 134 can be an electromechanically controlled valve, such as a two-port valve that is controlled by computer 123 in response to various feedback data from, e.g., pressure and flow sensors. Thus, valve 134 can emulate the operation of a check valve by being controlled according to various system conditions.

Figure 2:
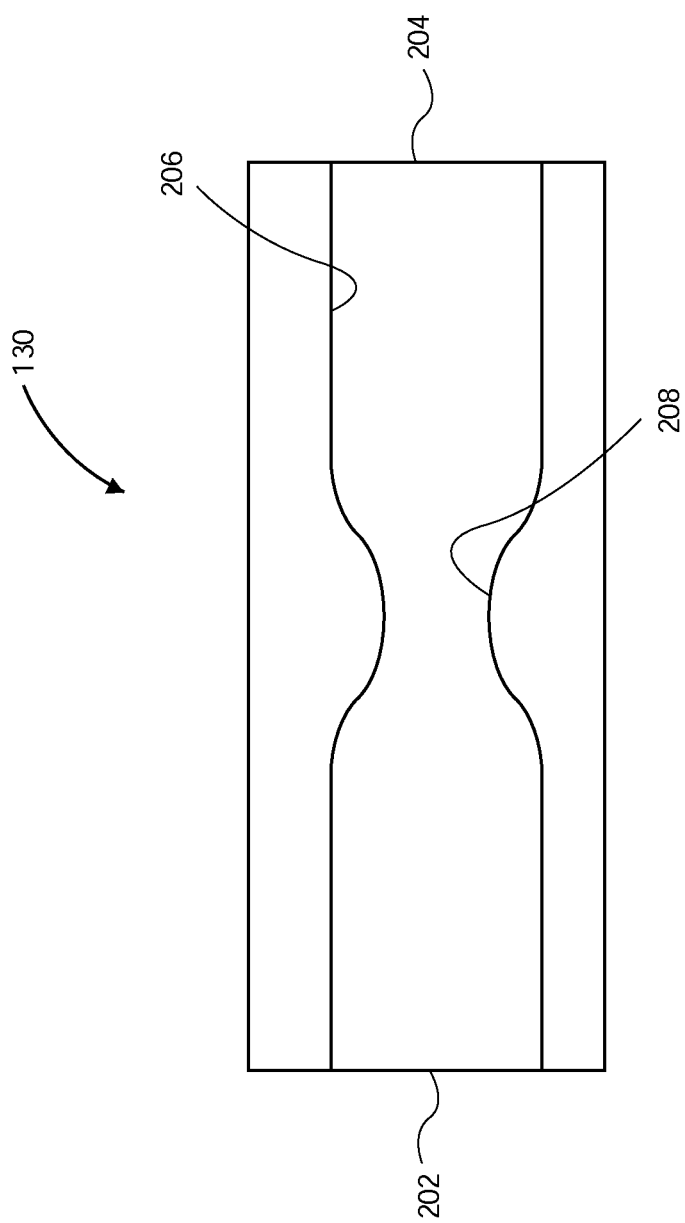
FIG. 2 is a schematic view illustration of a fixed orifice component of a dual orifice in accordance with an embodiment.

Having generally described an embodiment of HMA 101, several components of DO 112 will now be given further attention. Referring now to FIG. 2, a schematic view illustration of a fixed orifice component of a dual orifice is shown in accordance with an embodiment. Fixed orifice 130 includes supply port 202 and return port 204. Supply port 202 can be connected with supply conduit 102 and return port 204 can be connected with return conduit 104. For example, supply port 202 and return port 204 can include any of various fittings, e.g., threaded or clamp, that are known in the art for interconnecting hydraulic conduits. Fixed orifice 130 also includes channel 206 between supply port 202 and return port 204. Channel 206 conveys fluid from supply conduit 102 to return conduit 104. In addition, fixed orifice 130 includes restriction 308 located within channel 206. Restriction 308 limits flow through fixed orifice 130. It will be appreciated that restriction 308 can be configured with numerous shapes to produce the desired flow effect. For example, restriction 308 can be shaped in a manner to maintain laminar flow of hydraulic fluid or to induce turbulent flow, if desired. Without limitation, restriction 308 can be a smooth orifice, a sharp-edged orifice, or a roughened orifice of various diameters and cross-sections.

Thus, it will be appreciated that in at least one embodiment, fixed orifice 130 can be configured as a simple flow restriction formed in a channel. However, it will be appreciated that fixed orifice 130 can be embodied by numerous other valves and flow restrictors, as well. For example, in at least one alternative embodiment, fixed orifice 130 can include a solenoid valve that is maintained in an open state to allow for the continuous flow of hydraulic fluid through the solenoid valve. This and other embodiments will be contemplated by one skilled in the art within the scope of this description.

Figure 3:
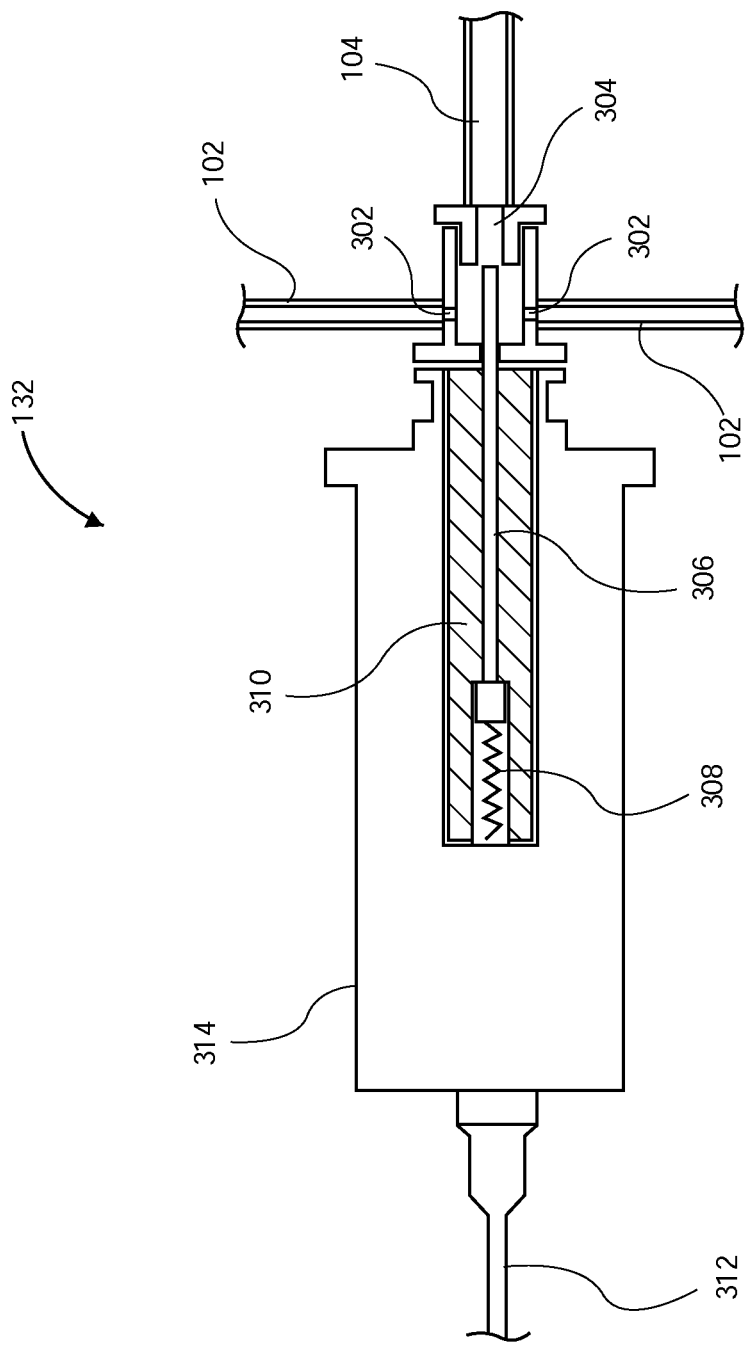
FIG. 3 is a schematic view illustration of a variable orifice component of a dual orifice in accordance with an embodiment.

Referring now to FIG. 3, a schematic view illustration of a variable orifice component of a dual orifice is shown in accordance with an embodiment. Variable orifice 132 can include a solenoid valve, as represented by FIG. 3. The various components of variable orifice 132 having a solenoid valve can be packaged within one or more subassemblies, such as housing 314. More specifically, variable orifice 132 can include supply port 302 connected with supply conduit 102 and return port 304 connected with return conduit 104. Hydraulic fluid flow from supply port 302 to return port 304 can be affected by the actuation of plunger 306. More specifically, plunger 306 can be moved between a first position, in which it restricts or prevents flow through return conduit 104, to a second position, in which it permits such flow. Even more particularly, when the solenoid valve is deenergized, plunger 306 can be biased toward the return port 304 by spring 308 in order to obstruct hydraulic fluid flow through the return port 304. However, when the solenoid valve is energized, plunger 306 can be moved away from return port 304 by a magnetic force applied to the plunger 306, or a related component. The magnetic force can result from current flow through coil windings 310, as is well known in the art. Coil windings 310 can be energized by electricity provided by wiring 312.

Thus, it will be appreciated that in at least one embodiment, variable orifice 132 can include, or be represented by, a solenoid valve. However, it will further be appreciated that variable orifice can be embodied by any number of variable output valves and fittings, such as those that are driven by motors or hydraulics, as is well known in the art. Furthermore, it will be appreciated that although variable orifice 132 has mainly been described as having discrete open and closed states, variable orifice 132 could alternatively include a hydraulic fluid pathway with a varying diameter, such that flow can be increased and decreased gradually from a closed configuration to a maximum flow configuration, rather than being fully open or fully closed.

In yet another embodiment, fixed orifice 130 and variable orifice 132 can be replaced with a single orifice component that simulates the function of the two orifices. For example, a single variable orifice like variable orifice 132 shown in FIG. 4 can be used that has a low flow and a high flow configuration. In the low flow configuration, a plunger of the single variable orifice can be positioned to allow a first flow. For example, in the low flow configuration, single variable orifice can allow flow in a range of 1 to 5 GPM when hydraulic fluid pressure in supply conduit 102 is at 3000 psig pressure. In the high flow configuration, the plunger can be moved to allow a second flow, such as a flow in a range of 6 to 20 GPM. Thus, the alternative variable orifice can simulate fixed orifice 130 in the low flow configuration and it can simulate the combination of fixed orifice 130 and variable orifice 132 in the high flow configuration. This varying flow can be achieved by designing the single orifice component flow to depend on the stroke as well as the diametric gap between plunger 306 and return port 304, as will be apparent to one skilled in the art.

In still another embodiment, DO 112 can be replaced with a multi-orifice bypass valve with more than two orifices. For example, DO 112 can have three or more orifices of various flow rate capacities. These orifices can be fixed or variable. Thus, the term "dual orifice" as used in this description is not to be interpreted as being limited to two orifices.

The various components of HMA 101 described above, as well as the subcomponents of those components, can be fabricated from materials that are commonly used in aircraft hydraulic systems. For example, in at least one embodiment, one or more components may be wholly or partially formed from material groups including copper, aluminum alloy, steel, or titanium 3Al-2.5V alloy. Furthermore, it will be appreciated by one skilled in the art that the various components can be designed with various shapes, profiles, and cross-sections to achieve the functionality described above. These various features and modifications have been omitted in some cases for the sake of brevity, but they are considered to be within the scope of the description.

Figure 4A:
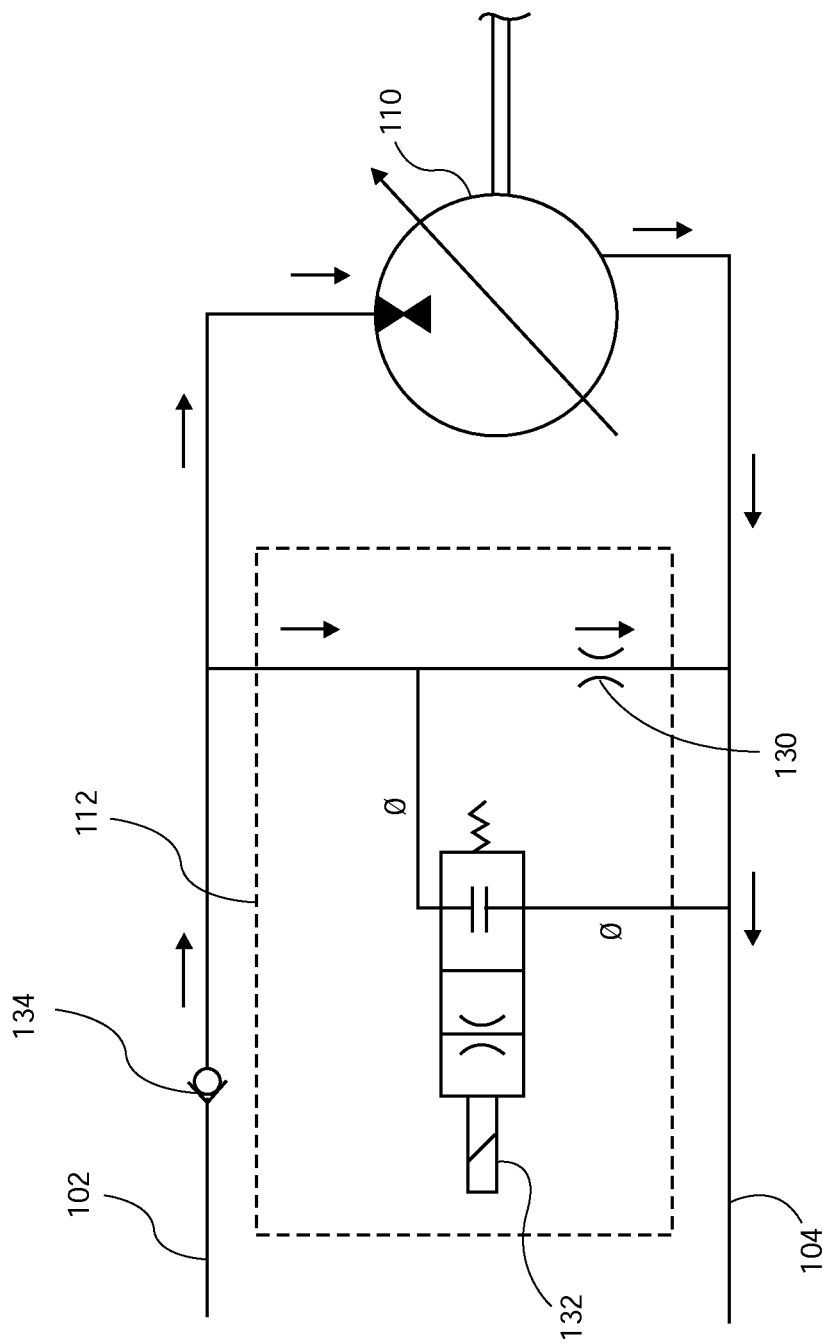
FIG. 4A is a schematic view illustration of a hydraulic motor assembly operating with a variable displacement motor-pump in a motor mode in accordance with an embodiment.

Having outlined several features of HMA 101 and its components, additional detail will now be provided related to patterns of hydraulic fluid flow through HMA 101 under different operating conditions. Referring now to FIG. 4A, a schematic view illustration of a hydraulic motor assembly operating with a VDMP 110 in a motor mode is shown in accordance with an embodiment. With VDMP 110 operating in this mode, spline shaft 118 and hose reel 119 are rotated in a retract direction to cause the hose to be retracted onto hose reel 119. Again, this is a process that involves operation of the feedback controlled HMA 101 system using active system commands and various feedback loops.

As previously discussed, while VDMP 110 operates in a motor mode, hydraulic fluid is circulated from supply conduit 102 through both VDMP 110 and DO 112. More specifically, hydraulic fluid flows through VDMP 110 and bleeds through fixed orifice 130 of DO 112. The hydraulic fluid drives VDMP 110 in motor mode to retract the hose, and returns to aircraft hydraulic system 113 via return conduit 104. In at least one embodiment, there is no flow through variable orifice 132 of DO 112 in motor mode. There is typically no need for such flow since the hydraulic fluid is optimally directed through VDMP 110 in order to generate sufficient torque to retract the hose onto hose reel 119. Thus, bleeding of hydraulic fluid through DO 112 is limited to flow through fixed orifice 130 by closing variable orifice 132 while VDMP 110 operates in motor mode. Limitation of bleeding is desirable because the hydraulic fluid bleed is essentially wasted flow and lost energy, given that the bleed flow is not used to generate torque through VDMP 110. In an embodiment, fixed orifice 130 can continuously bleed hydraulic fluid at a rate in a range of 1 to 5 GPM.

Figure 4B:
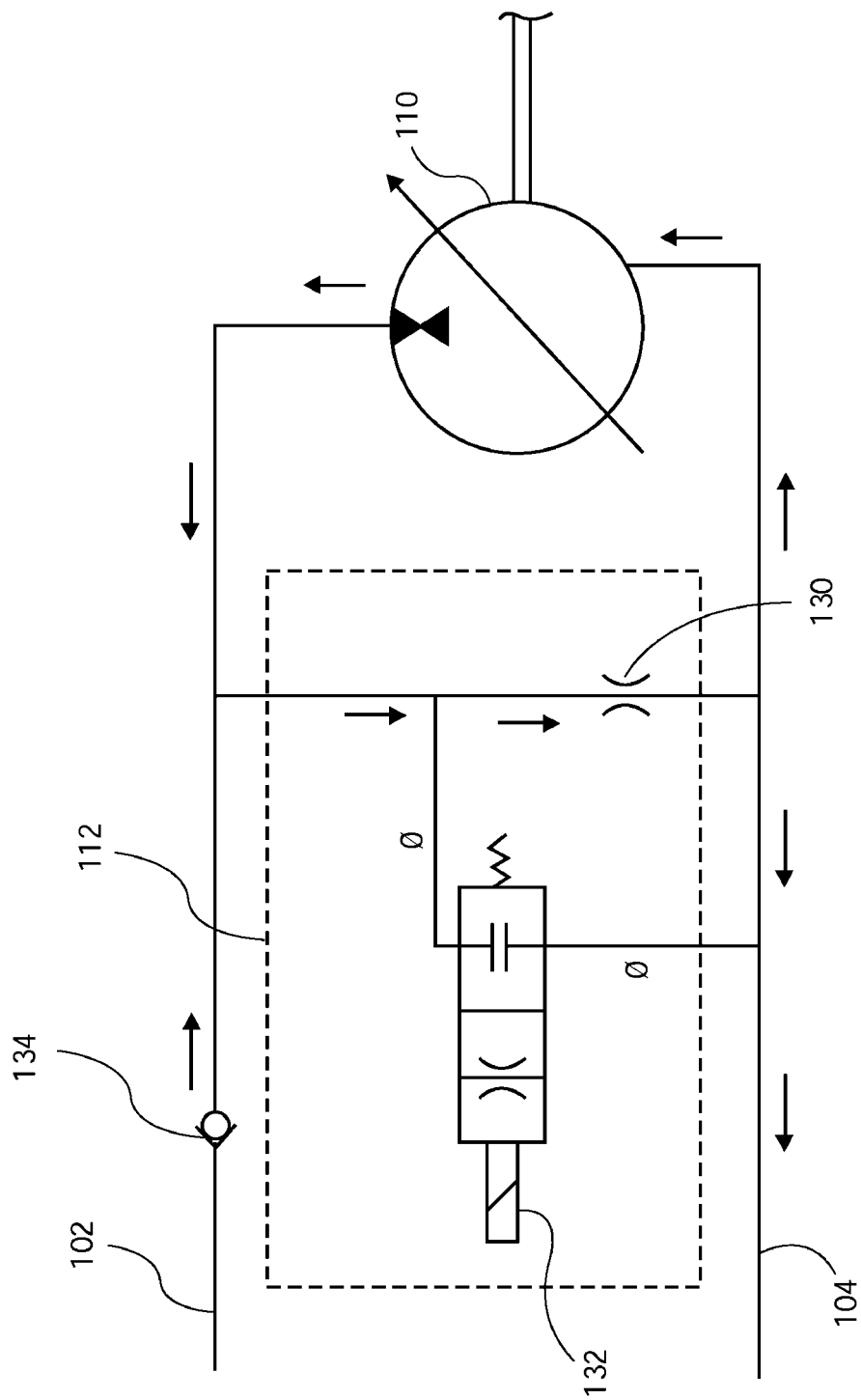
FIG. 4B is a schematic view illustration of a hydraulic motor assembly operating with a variable displacement motor-pump in a pump mode at low flow in accordance with an embodiment.

Referring now to FIG. 4B, a schematic view illustration of a hydraulic motor assembly operating with a VDMP 110 in a pump mode at low flow is shown in accordance with an embodiment. Building on the previous description, hydraulic fluid is still conveyed through DO 112 from supply conduit 102 to return conduit 104 when VDMP 110 operates in a low flow pump mode. However, in this mode of operation, hydraulic fluid flows through VDMP 110 from return conduit 104 to supply conduit 102. Flow through VDMP 110 can be relatively low when the hose is trailing at a low speed or low tension. More specifically, flow generated by VDMP 110 in a low flow pump mode can generally be in a range of about 1 to 5 GPM to produce sufficient output torque at spline shaft 118 in order to maintain hose reel 119 rotation at the appropriate rate. It will be appreciated that this rate could actually be zero, as in the case when hose reel 119 is kept stationary to maintain the hose at a constant position.

As discussed above, given that flow through VDMP 110 remains below about 1 to 5 GPM in the low flow pump mode, fixed orifice 130 typically provides a sufficient passage for hydraulic fluid to circulate through DO 112. Thus, variable orifice 132 can remain closed to limit bleeding from the aircraft hydraulic system 113. As will be described below, hydraulic fluid can be supplied by aircraft hydraulic system 113 to DO 112 to maintain fixed orifice 130 at a rated flow rate when flow through VDMP 110 operating in the low flow pump mode is below the rated flow rate.

Figure 4C:
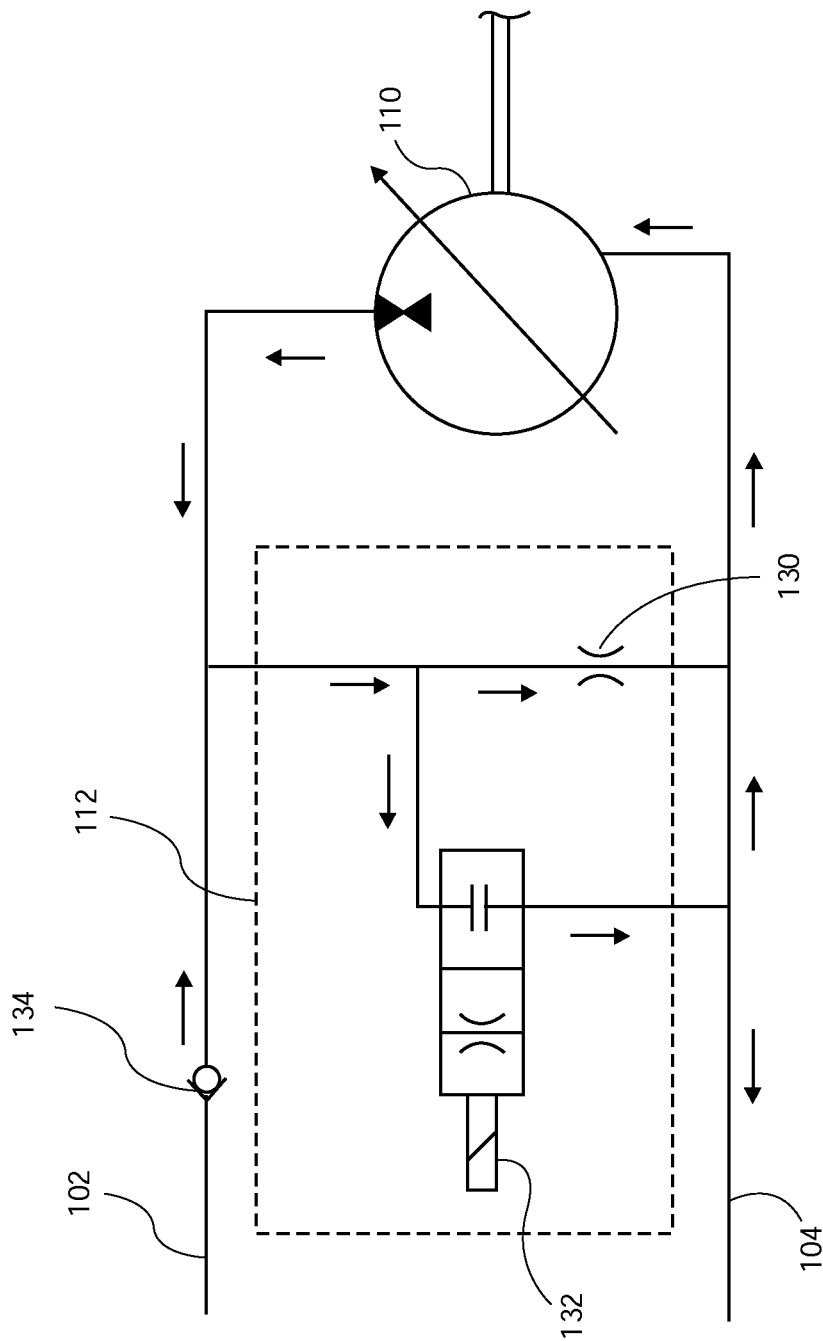
FIG. 4C is a schematic view illustration of a hydraulic motor assembly operating with a variable displacement motor-pump in a pump mode at high flow in accordance with an embodiment.

Referring to FIG. 4C, a schematic view illustration of a hydraulic motor assembly operating with a VDMP 110 in a pump mode at high flow is shown in accordance with an embodiment. In the high flow pump mode, hydraulic fluid flows through VDMP 110 from return conduit 104 to supply conduit 102. As discussed above, flow through VDMP 110 can be increased to accommodate increased output torque requirements. Output torque requirements can increase due to, e.g., high aerodynamic loads from adverse weather conditions or increased loads applied by the receiver aircraft during the flowing disconnect stage. In these scenarios, increased torque must be transmitted to hose reel 119 through spline shaft 118. Thus, displacement of VDMP 110 is controlled by computer 123 to operate VDMP 110 in a high flow pump mode. In this mode, flows can exceed the low flow upper limit of about 1 to 5 GPM. As an example, hydraulic fluid flow through VDMP 110 can be increased to about 12.5 GPM in the high flow pump mode.

To accommodate the increased flow through VDMP 110, hydraulic fluid can be directed through both fixed orifice 130 and variable orifice 132 of DO 112. More specifically, variable orifice 132 can be actuated to an open position by computer 123 in response to determining that pump flow from VDMP 110 will exceed predetermined levels. This determining can include calculating expected flow that will result from changes to VDMP 110 operation, e.g., displacement or speed, required to achieve the necessary torque output. Even more particularly, variable orifice 132 can be opened to permit a flow rate of about 5 to 15 GPM of hydraulic fluid to flow from supply conduit 102 to return conduit 104. Thus, the combined flow through fixed orifice 130 and variable orifice 132 of DO 112 can result in total flow in a range of about 6 to 20 GPM through DO 112. As will be described below, hydraulic fluid can be supplied by aircraft hydraulic system 113 to DO 112 to maintain fixed orifice 130 and variable orifice 132 at a combined rated flow rate when flow through VDMP 110 operating in the high flow pump mode is below the combined rated flow rate.

Figure 5:
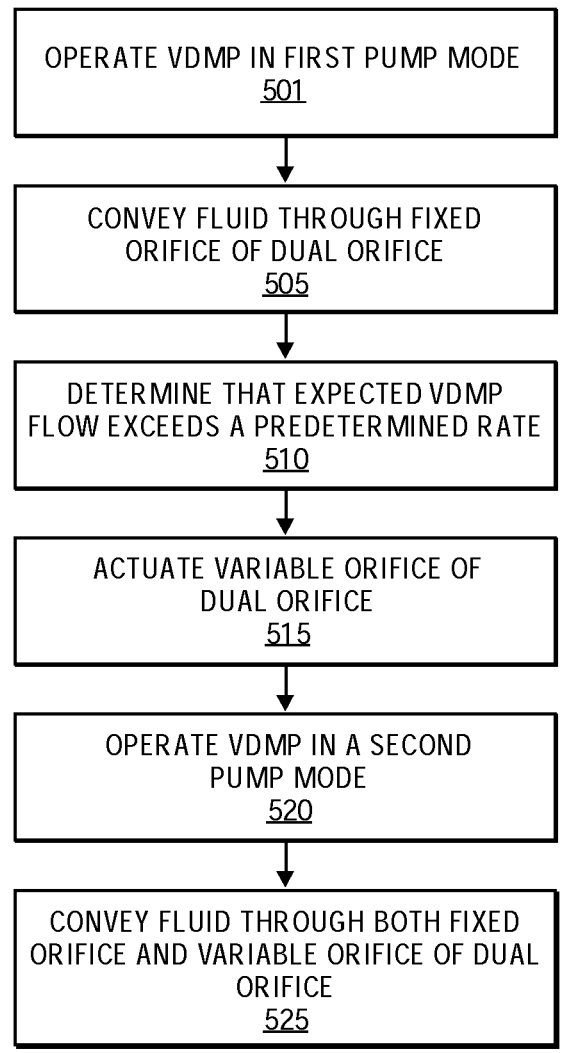
FIG. 5 is a method of using a hydraulic motor assembly in accordance with an embodiment.

Referring to FIG. 5, a method of using a hydraulic motor assembly is shown in accordance with an embodiment. At operation 501, VDMP 110 is operated in a first pump mode. For example, VDMP 110 can be operated in a low flow pump mode. It will now be appreciated that this mode may be used when the hose is trailing at low speed and/or low tension, i.e., when low output torque is required. As discussed above, the displacement and speed of VDMP 110 can be controlled by computer 123 through actuation of control piston 125 in response to various feedback signals from sensors, e.g., linear variable differential transformer displacement transducers, dual speed sensors, and load cell sensors connected with a planetary gear box (not shown) that is placed between spline shaft 118 and hose reel 119 indicating that low output torque is required. More particularly, in this mode, VDMP 110 may be operated to generate only about 1 to 5 GPM of hydraulic fluid flow from return conduit 104 to supply conduit 102.

At operation 505, hydraulic fluid is conveyed through fixed orifice 130 of DO 112 while VDMP 110 operates in the low flow pump mode. In an embodiment, this fluid can be a combination of hydraulic fluid flowing from aircraft hydraulic system 113 and hydraulic fluid flowing in reverse from the first port of VDMP 110. For example, in an embodiment, fixed orifice 130 allows 5 GPM of hydraulic fluid flow when hydraulic fluid in supply conduit 102 is at about 3000 psig. However, if VDMP 110 is operated in a low flow pump mode with a flow of only 3 GPM to achieve the necessary torque output, then additional flow is required to maintain fixed orifice 130 at optimal flow conditions. Thus, aircraft hydraulic system 113 can supply 2 GPM of hydraulic fluid flow to fixed orifice 130 to maintain fixed orifice 130 at the maximum flow capacity of 5 GPM. If flow through VDMP 110 decreases to generate less output torque, then hydraulic fluid supply from aircraft hydraulic system 113 will increase, maintaining fixed orifice 130 at maximum flow capacity. Likewise, if flow through VDMP 110 increases to generate more output torque, then hydraulic fluid supply from aircraft hydraulic system 113 will decrease, maintaining fixed orifice 130 at maximum flow capacity. Thus, the hydraulic fluid recirculated to VDMP 110 can be a mixture of hydraulic fluid coming from aircraft hydraulic system 113 and hydraulic fluid coming from VDMP 110.

In an embodiment, the mixing of hydraulic fluid from aircraft hydraulic system 113 and VDMP 110 as it flows through fixed orifice 130 has an overall cooling effect on the hydraulic fluid that is recirculated to VDMP 110. Since the total volume of fluid in the recirculating loop is small, the fluid temperature will quickly reach an intolerable level if the fluid is repeatedly passed through fixed orifice 130. Excess heating may damage the fluid to the point of having to be replaced because it becomes corrosive, elastomer seals may be damaged or destroyed, and overheated fluid may present a fire danger. However, hydraulic fluid flowing from aircraft hydraulic system 113 can be cooler than the recirculated hydraulic fluid. Therefore, mixing hydraulic fluid from aircraft hydraulic system 113 and VDMP 110 in DO 112 will supply cooler hydraulic fluid at an outlet of DO 112 than would otherwise be the case if the same hydraulic fluid was recirculated continuously during the pump mode. A portion of the mixed fluid will be returned to aircraft hydraulic system 113 through return conduit 104 where the imparted heat can be dissipated. Additionally, a portion of the mixed fluid will be recirculated to VDMP 110 in the pump mode at the cooled temperature. Thus, the mixing function of DO 112 can prevent damage to the hydraulic fluid inside HMA 101 as well as to VDMP 110.

At operation 510, feedback signals are received by computer 123 indicating that increased torque output is required by VDMP 110. For example, feedback signals indicating that high aerodynamic loads require high braking torque or that the receiver aircraft is trying to disengage within the refueling range, i.e., during a flowing disconnect stage of the refueling cycle, can be received by computer 123. These signals can be generated by any of the previously described sensors. In response to these signals, computer 123 calculates an expected pump flow resulting from adjustment of VDMP 110 to achieve the required output torque. For example, computer 123 can determine that the expected flow from VDMP 110 will enter a high flow pump mode and exceed a predetermined rate as a result of changes to VDMP 110 displacement to achieve a necessary high braking torque. As described earlier, this predetermined rate could be greater than 1 GPM, such as in a range of about 1 to 5 GPM.

At operation 515, in response to computer 123 calculating the expected flow based on feedback signals received at operation 510 and determining that the expected flow is above the predetermined level, computer 123 actuates variable orifice 132 to increase the allowable flow rate of DO 112. Actuation can be caused by, for example, energization of a solenoid valve of variable orifice 132.

At operation 520, VDMP 110 can be operated in a second pump mode. For example, VDMP 110 can be operated in the high flow pump mode. As described above, computer 123 can control the displacement and speed of VDMP 110 through actuation of control piston 125. As a result, VDMP 110 pump flow will increase until VDMP 110 enters the high flow pump mode. In an embodiment, VDMP 110 will enter the high flow pump mode when the flow generated by VDMP 110 exceeds the predetermined rate. This predetermined rate can be chosen to coincide with the flow capacity of fixed orifice 130. For example, as described above, in at least one embodiment this predetermined rate can be in a range of about 1 to 5 GPM.

At operation 525, hydraulic fluid is conveyed through both fixed orifice 130 and variable orifice 132 of DO 112. DO 112 can allow about 6 to 20 GPM hydraulic fluid flow when both fixed orifice 130 and variable orifice 132 are open and the pressure of hydraulic fluid in supply conduit 102 is about 3000 psig. For example, under such conditions, fixed orifice 130 can accommodate hydraulic fluid flow in a range of about 1 to 5 GPM and variable orifice 132 can accommodate hydraulic fluid flow in a range of about 5 to 15 GPM. However, as noted above, DO 112 can accommodate other maximum flow conditions through fixed orifice 130 and variable orifice 132. Furthermore, it will be appreciated that hydraulic fluid flow through DO 112 in this mode can be a mixture of hydraulic fluid recirculated from VDMP 110 and supplied by aircraft hydraulic system 113, in a manner similar to that described above with respect to operation 505. More specifically, aircraft hydraulic system 113 can supply additional hydraulic fluid to DO 112 to maintain DO 112 at a maximum flow capacity when flow generated by VDMP 110 is less than the maximum flow capacity. Thus, the output of DO 112 can be a cooled mixture of hydraulic fluid that prevents damage to VDMP 110 and returns heat generated by DO 112 to the aircraft hydraulic system 113, where it can be dissipated.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A hydraulic motor assembly, comprising:
a variable displacement motor-pump coupled with a supply conduit and a return conduit and comprising a spline shaft coupled with a hose reel of an aerial refueling system, wherein the variable displacement motor-pump operates in a pump mode at a flow rate to rotate the hose reel in a trail direction; and
a dual orifice coupled with the supply conduit and the return conduit in parallel with the variable displacement motor-pump, the dual orifice comprising:
a fixed orifice to continuously convey hydraulic fluid from the supply conduit to the return conduit; and
a variable orifice to convey hydraulic fluid from the supply conduit to the return conduit only when the variable displacement motor-pump operates in the pump mode and the flow rate reaches a predetermined rate.

2. The hydraulic motor assembly of claim 1, wherein the predetermined rate is more than 1 gallon per minute.

3. The hydraulic motor assembly of claim 2, wherein the predetermined rate is in a range of 1 to 5 gallons per minute.

4. The hydraulic motor assembly of claim 1, wherein the fixed orifice continuously conveys hydraulic fluid at a rate in a range of 1 to 5 gallons per minute when the hydraulic fluid in the supply conduit is about 3000 psig pressure.

5. The hydraulic motor assembly of claim 1, wherein the variable orifice conveys hydraulic fluid at a rate in a range of 5 to 15 gallons per minute.

6. The hydraulic motor assembly of claim 1, wherein the variable orifice comprises a solenoid valve.

7. The hydraulic motor assembly of claim 1, further comprising a check valve located between the variable displacement motor-pump and an aircraft hydraulic system to prevent backflow of hydraulic fluid into the aircraft hydraulic system.

8. A dual orifice comprising:
a fixed orifice to continuously convey hydraulic fluid from a supply conduit to a return conduit of an aircraft hydraulic system; and
a variable orifice to convey hydraulic fluid from the supply conduit to the return conduit only when a variable displacement motor-pump operates in a pump mode at a predetermined flow rate.

9. The dual orifice of claim 8, wherein the predetermined rate is more than 1 gallon per minute.

10. The dual orifice of claim 9, wherein the predetermined rate is in a range of 1 to 5 gallons per minute.

11. The dual orifice of claim 8, wherein the fixed orifice continuously conveys hydraulic fluid at a rate in a range of 1 to 5 gallons per minute when the hydraulic fluid in the supply conduit is about 3000 psig pressure.

12. The dual orifice of claim 8, wherein the variable orifice conveys hydraulic fluid at a rate in a range of 5 to 15 gallons per minute.

13. The hydraulic motor assembly of claim 8, wherein the variable orifice comprises a solenoid valve.

14. A method, comprising:
operating a variable displacement motor-pump in a first pump mode at a first flow rate to rotate a hose reel of an aircraft refueling system in a trail direction;
conveying hydraulic fluid from a supply conduit to a return conduit through a fixed orifice of a dual orifice;

operating the variable displacement motor-pump in a second pump mode at a second flow rate; and conveying hydraulic fluid from the supply conduit to the return conduit through both the fixed orifice and a variable orifice of the dual orifice in response to the second pump mode.

15. The method of claim 14, wherein the second flow rate is more than 1 gallon per minute.

16. The method of claim 15, wherein the second flow rate is in a range of 1 to 5 gallons per minute.

17. The method of claim 14, wherein the fixed orifice continuously conveys hydraulic fluid at a rate in a range of 1 to 5 gallons per minute when the hydraulic fluid in the supply conduit is at about 3000 psig pressure.

18. The method of claim 14, wherein the variable orifice conveys hydraulic fluid at a rate in a range of 5 to 15 gallons per minute.

19. The method of claim 14, wherein the variable orifice comprises a solenoid valve.

\* \* \* \* \*